United States Patent [19]

Handa et al.

[11] Patent Number: 5,498,507
[45] Date of Patent: Mar. 12, 1996

[54] OPTICAL RECORDING MEDIA

[75] Inventors: Tokuhiko Handa; Ryo Inaba; Susumu Haratani; Junji Tominaga, all of Nagano, Japan

[73] Assignee: TDK Corporation, Tokyo, Japan

[21] Appl. No.: 394,817

[22] Filed: Feb. 27, 1995

[30] Foreign Application Priority Data

Mar. 29, 1994 [JP] Japan .................... 6-082235

[51] Int. Cl.$^6$ .................................................. G11B 7/24
[52] U.S. Cl. .................... 430/273.1; 430/271.1; 430/945; 369/284
[58] Field of Search ........................... 430/270, 271, 430/273, 495, 945, 19; 369/284

[56] References Cited

U.S. PATENT DOCUMENTS

| | | | |
|---|---|---|---|
| 4,984,231 | 1/1991 | Yasuoka et al. | 369/275.1 |
| 5,191,565 | 3/1993 | Inoue et al. | 369/284 |
| 5,230,973 | 7/1993 | Yoshioka et al. | 430/19 |
| 5,395,669 | 3/1995 | Kawahara et al. | 428/64 |
| 5,418,030 | 5/1995 | Tominaga et al. | 428/64 |
| 5,470,628 | 11/1995 | Tominaga et al. | 428/64.4 |

FOREIGN PATENT DOCUMENTS 5-217211  8/1993  Japan .

OTHER PUBLICATIONS

"V and Ti Doping Effect on In–Ag–Te–Sb Optical Phase Change Rewritable Disc", Tominaga et al, Jpn. J. Appl. Phys. vol. 23 pp. 1980–1982 (May 1993).

English Language Abstract of JP 3–052139, Shigeaki et al., "Optical Information Recording Medium", Mar. 1991.
English Language Abstract of JP 5–062249, Kenichi et al., "Optical Information Recording Medium", Mar. 1993.
English Language Abstract of JP 5–185733, Isao et al., "Data Recording Medium", Jul. 1993.

*Primary Examiner*—Charles L. Bowers, Jr.
*Assistant Examiner*—John A. McPherson
*Attorney, Agent, or Firm*—Watson Cole Grindle & Watson

[57] ABSTRACT

In a phase change type of optical recording medium including on a substrate a lower dielectric layer, a recording layer, a first upper dielectric layer contiguous to said recording layer, a second upper dielectric layer and a reflective layer, the recording layer comprises a recording material containing an element A that represents silver and/or gold, an element B that represents antimony and/or bismuth, an element C that represents tellurium and/or selenium, an element indium, and an element M that represents at least one element selected from the group consisting of titanium, zirconium, hafnium, vanadium, niobium, tantalum, manganese, tungsten and molybdenum, with the atomic ratio of the elements in said recording material having the following formula:

$$\{(A_aB_bC_{1-a-b})_x(In_{0.5}C_{0.5})_yB_{1-x-y}\}_{1-z}M_z$$

wherein $0.10 \leq a \leq 0.40$, $0.10 \leq b \leq 0.40$, $0.20 \leq x \leq 0.80$, $0.01 \leq y \leq 0.60$, and $0.001 \leq z \leq 0.20$. The first upper dielectric layer contains at least one compound selected from the group consisting of aluminum nitride, silicone nitride and aluminum oxide. The second upper dielectric layer is made up of a material that has a thermal conductivity lower than that of said first upper dielectric layer.

9 Claims, 1 Drawing Sheet

OPTICAL RECORDING MEDIA

BACKGROUND OF THE INVENTION

The present invention relates to an optical recording medium applied to record and erase information by use of a recording layer changing its crystallographic state.

Highlight is recently focused on optical recording media which can record information at a high density and erase the recorded information for rewriting. One typical rewritable optical recording medium is of phase change type wherein laser light is directed to the recording layer to change its crystallographic structure whereupon a concomitant change of reflectivity is detected. Optical recording media of the phase change type are of great interest because either recording or erasing may be chosen upon irradiation of a light beam simply by changing the intensity thereof, apparent overwrite recording is then possible with the use of a single light beam, and the drive unit has a simple optical system as compared with that of magnetooptical recording media.

Ge-Te materials have mostly been used for the phase change type of optical recording media because there is a large reflectivity difference between their crystalline and amorphous states and they are relatively high in terms of the stability of their amorphous state. More recently, it has been proposed to apply compounds called chalcopyrites.

Chalcopyrite type compounds have been investigated as compound semiconductor materials and have had application for solar batteries, etc. Referring now to the chemical periodic table, they have a composition represented by Ib-IIIb-VIb$_2$ or IIb-IVv-Vb$_2$ and have a structure that two diamond structures are stacked up together. The chalcopyrite type compounds can easily be structurally identified by X-ray structural analysis with the basic characteristics described in periodical publications "Physics", Vol. 8, No. 8, page 441 (1987) and "Electrochemistry", Vol. 56, No. 4, page 228 (1988) for instance.

Of these chalcopyrite type compounds, AgInTe$_2$ in particular is known to be capable of being used as a recording layer material for an optical recording medium used at a linear velocity of about 7 m/s, if it is diluted with Sb or Bi. See Japanese Patent Application Kokai(JP-A) No. 240590/1991, 99884/1991, 82593/1991 and 73384/1991 among which JP-A 240590/1991 in particular comes up with an information recording medium having a recording layer composed predominantly of $(AgInTe_2)_{1-a}M_a$ where M is Sb and/or Bi and $0.30 \leq a \leq 0.92$ and comprising a mixture of AgInTe$_2$ and M phases. The alleged advantages include improvements in sensitivity to laser writing, erasability, recording/erasing repeatability and erasing rates.

In recent years, highlight is also focused on optical recording disks which are recordable and reproducible at the same linear velocity (of about 1.2 m/s to about 1.4 m/s) as compact disks (CDs) for the reason that they can be used in combination with CDs and their drive units only by addition or modification of optical systems. For such optical recording disks, for instance, optical recording or magneto-optical recording disks of the write-once type in which organic dyes are used for recording layers have been developed. However, the above optical recording disks of the phase change type are now considered well suitable for such application because they are one beam overwritable and the optical system of the driving units used therewith is simple in construction.

JP-A 240590/1991 mentioned above describes in its example that the disk is rotated at a linear velocity of 7 m/s for recording. However, it has now been found that with the disk rotated at the same linear velocity as CDs, the obtained C/N is much lower than that obtained at a linear velocity of 7 m/s with a lowering of repetitive recording properties or characteristics. When an optical recording disk of the phase change type is used at a slow linear velocity such as one used for CDs, the heat of a laser beam has an influence on a region wider than the area irradiated with the laser beam. In the case of an optical recording medium of the phase change type prepared by use of a recording material based on (AgInTe$_2$)M, the area heated by a laser beam is rapidly cooled into a state so amorphous or microcrystalline that signals can be recorded thereon. In a recording region with long time 11T signals recorded thereon, the irradiation finish area remains slightly heated under the influence of an irradiated area adjacent thereto, so that it can remain slowly cooled, if the linear velocity is slow. Neither good C/N nor repetitive recording properties are consequently obtainable.

To provide a solution to such problems, it is required to use a material having a low crystal transition rate (at which an amorphous or microcrystalline phase grows into a coarse crystal phase) for a recording layer, thereby making it amorphous or microcrystalline even when the cooling rate is low.

In view of such considerations, we have come up with a recording layer having a controlled composition containing Ag, In, Te and Sb to which there is additionally added at least one element M selected from the group consisting of Ti, Zr, Hf, V, Nb, Ta, Mn, W and Mo, as described in "Jap. J. Appl. Phys.", 32(1993), 1980. The crystal transition rate of the recording layer is so reduced that the C/N and repetitive recording properties can be improved. This recording layer contains elements forming the above chalcopyrite compound, while the unrecorded region, for the most part, is made up of AgSbTe$_2$ (or a composition close thereto), InTe and Sb phases.

For a phase change type of optical recording medium, it is required that to increase signal strength, there be an increased difference (the degree of modulation) between the reflectivity of the crystalline state and the reflectivity of the amorphous or microcrystalline state. The as-formed recording layer by sputtering, because of being in an amorphous state, is first initialized. Initialization is operation for making the recording layer crystalline by heating and cooling. When signals are recorded on the as-initialized recording layer, however, the reflectivity of the area irradiated with recording light becomes higher than that of the as-formed area. This offers a problem that no theoretically possible degree of modulation can be obtained.

The reason that the reflectivity of the amorphous or microcrsytalline area formed by irradiation with recording light becomes higher than that of the as-formed area is that recrystallization, if not large, occurs when the recording layer melted by recording light is cooled. Such recrystallization becomes noticeable especially when recording occurs at a low linear velocity such as one encountered in the case of CDs. The reason is that the low linear velocity makes the post-melting cooling rate low. Such a degree-of-modulation reduction becomes considerable upon repetition of recording; that is, some limitation is imposed on the number of repetitive recording cycles. The reduction in the degree of modulation may possibly be limited by regulating the composition of the recording layer to decrease the crystal transition rate. However, the reduction in the crystal transition rate, in turn, makes it difficult to erase the recorded signals. Even when relying upon the recording layer in the above "Jap. Appl. Phys.", 32 (1993), 1980, difficulty is thus involved in increasing both the degree of modulation and the erasing rate to sufficient levels.

SUMMARY OF THE INVENTION

An object of the present invention is to provide a phase change type of optical recording medium that is high in terms of the degree of modulation, enables repetitive recording to be done with no or little deterioration of the degree of modulation, and keeps the erasing rate high.

According to the present invention, the object mentioned above is achieved by the provision of:

An optical recording medium including on a substrate a lower dielectric layer, a recording layer, a first upper dielectric layer contiguous to said recording layer, a second upper dielectric layer and a reflective layer in the order mentioned above, wherein information is recorded or erased by irradiating said recording layer with a light beam to change its crystallographic state, characterized in that:

said recording layer comprises a recording material containing an element A that represents silver and/or gold, and an element B that represents antimony and/or bismuth, an element C that represents tellurium and/or selenium, an element indium, and an element M that represents at least element selected from the group consisting of titanium, zirconium, hafnium, vanadium, niobium, tantalum, manganese, tungsten and molybdenum, with the atomic ratio of the elements in said recording material having the following formula:

$$\{(A_aB_bC_{1-a-b})_x(In_{0.5}C_{0.5})_yB_{1-x-y}\}_{1-z}M_z$$

wherein:

$0.10 \leq a \leq 0.40$ $0.10 \leq b \leq 0.40$ $0.20 \leq x \leq 0.80$ $0.01 \leq y \leq 0.60$ $0.001 \leq z \leq 0.20$ said first upper dielectric layer contains at least one compound selected from the group consisting of aluminum nitride, silicone nitride and aluminum oxide, and said second upper dielectric layer is made up of a material that has a thermal conductivity lower than that of said first upper dielectric layer.

Preferably, the first upper dielectric layer is substantially made up of at least one compound selected from the group consisting of aluminum nitride, silicon nitride and aluminum oxide, with the ratio of the metal(s) relative to the total of the metal(s), nitrogen and oxygen ranging from 30 at % to 70 at %.

Preferably, the second upper dielectric layer contains zinc sulfide.

Preferably, the second upper dielectric layer contains silicon oxide.

Preferably, the second upper dielectric layer is substantially made up of zinc sulfide and silicon oxide, with the $SiO_2/(ZnS+SiO_2)$ ratio lying in the range of 10 mol % to 50 mol % when zinc sulfide and silicon oxide are calculated as ZnS and $SiO_2$, respectively.

Preferably, the first upper dielectric layer is 50 Å to 500 Å in thickness.

Preferably, the second upper dielectric layer is 50 Å to 500 Å in thickness.

Preferably, the recording layer is 100 Å to 500 Å in thickness.

Preferably, silver accounts for at least 50 at % of the element A; antimony accounts for at least 50 at % of the element B; and tellurium accounts for at least 50 at % of the element C.

Preferably, the relative speed of the recording layer relative to a light beam is 1.0 m/s to 10.0 m/s.

BENEFITS OF THE INVENTION

According to the present invention, the specific recording material is used with the upper dielectric layers of specific construction located between the recording layer and the reflective layer, thereby making it possible to improve the degree of modulation and erasing rate and to prevent any possible deterioration of the degree of modulation due to repetitive recording.

In the present invention, the element(s) M is added to the recording material as in the case of "Jap. J. Appl. Phys.", 32(1993), 1980. The element(s) M inhibits crystal growth by partial substitution of the crystal therewith, resulting in a lowering of the crystal transition rate. This appears to ensure that good C/N and high degrees of modulation are achievable even at low linear velocities, with some considerable improvement in repetitive recording properties.

The upper dielectric layers are made up of at least the first upper dielectric layer contiguous to the recording layer and the second upper dielectric layer located on the side of the reflective layer. The first upper dielectric layer contains at least one compound selected from the group consisting of aluminum nitride, silicon nitride and aluminum oxide. The first upper dielectric layer is located contiguous to the recording layer and the second dielectric layer lower in thermal conductivity than the first upper dielectric layer is provided on the first upper recording layer, so that the erasing rate can be greatly improved with no deterioration of the degree of modulation and any possible deterioration of the degree of modulation due to repetitive recording can be avoided as well. One major feature of the present invention lies in the combination of the recording layer having the above composition with the first and second upper dielectric layers.

Much better results are obtained when the ratio of the metals in the first upper dielectric layer is in the range defined above, when the second upper dielectric layer is made up of a mixture of zinc sulfide with silicon oxide and the proportion of silicon oxide in the second upper dielectric layer is in the range defined above, and when the first and second upper dielectric layers have their thickness in the range defined above.

Referring here to JP-A 217211/1993, there is proposed a phase change type of optical recording medium including on a substrate an optical recording layer containing at least silver, a protective layer assembly and a heat release layer wherein the protective layer assembly is made up of two layers, one being an inner layer located adjacent to the optical recording layer and composed of a nitride or a carbide and the other an outer layer composed of zinc sulfide or a composite compound containing zinc sulfide. In the "Detailed Explanation of the Invention" in the publication, the inner protective layer adjacent to the optical recording layer is described as comprising SiN, SiC and AlN and having a thickness of 50 Å to 500 Å, while the outer protective layer is described as comprising ZnS.$SiO_2$ and having a thickness of 1,000 Å to 3,000 Å. The publication states in its example that the optical recording layer (of 1,000 Å in thickness) is formed by the sputtering technique using a target composed of Ag, In, Te and Sb at an atomic ratio of 1:1:2:4, while the inner protective layer (of 100 Å in thickness) adjacent to the optical recording layer is formed of SiN by reactive sputtering and the outer protective layer (of 1,000 Å in thickness) is formed of ZnS.SiO$_2$ by sputtering.

The object of the invention described in the publication is to provide a phase change type of optical recording medium having improved recording, erasing and repetitive properties. However, the publication says nothing about the degree of modulation. Nor is the degree of modulation measured in the examples. The publication states that the number of repetition with the recording properties kept at 45 dB or more is 100,000 or more, but does not refer to the linear velocity having a large influence on repetitive properties. With the referred-to invention, it is impossible to achieve the benefits of the present invention, as can be seen from the comparative examples to be given later, because the publication does not disclose any composition of the optical recording layer within the scope defined in the present disclosure. Also, the publication is silent about the ratio of the metals in the protective layer corresponding to the present first upper dielectric layer and the proportion of SiO$_2$ in the protective layer corresponding to the present second upper dielectric layer. Moreover, the thicknesses of the outer protective layer and recording layer depart from the preferable range defined by the present invention.

DETAILED DESCRIPTION OF THE INVENTION

Some illustrative constructions of the present invention will now be explained at great length.

The present invention provides an optical recording medium including a recording layer on a substrate wherein information is recorded or erased by irradiating said recording layer with a light beam to change its crystallographic state of the recording material within said recording layer.

In the present invention the recording material contains an element A that represents silver (Ag) and/or gold (Au), an element B that represents antimony (Sb) and/or bismuth (Bi), an element C that represents tellurium (Te) and/or selenium (Se), an element indium (In) and an element M that represents at least one element selected from the group consisting of titanium (Ti), zirconium (Zr), hafnium (Hf), vanadium (V), niobium (Nb), tantalum (Ta), manganese (Mn), tungsten (W) and molybdenum (Mo), with the atomic ratio of the elements in said recording layer having the following formula:

$$\{(A_aB_bC_{1-a-b})_x(In_{0.5}C_{0.5})_yB_{1-x-y}\}_{1-z}M_z$$

Here 0.10≦a≦0.40, preferably 0.15≦a≦0.35
0.10≦b≦0.40, preferably 0.15≦b≦0.35
0.20≦x≦0.80, preferably 0.30≦x≦0.70
0.01≦y≦0.60, preferably 0.01≦y≦0.40
0.001≦z≦0.20, preferably 0.001≦z≦0.02

Too small or large a incurs some considerable deterioration of the degree of modulation and C/N upon repetitive recording. Too small or large b gives rise to a reduction in the reflectivity change of the recording layer incidental to phase changes, so failing to obtain any sufficient degree of modulation. In the most preferable embodiment, A, B and C are contained in the recording layer at the ratio of ABC2.

Too small or large x gives rise to a reduction in the reflectivity change of the recording layer incidental to phase changes, so failing to obtain any sufficient degree of modulation. Too small y incurs a reduction in the crystal transition rate, so failing to assure any sufficient erasing rate, whereas too large y entails an increase in the crystal transition rate, so failing to obtain any sufficient degree of modulation and C/N at low linear velocity.

Silver or Ag is preferable as the element A, and accounts for preferably at least 50 at %, more preferably at least 80 at % of the element A. In the most preferable embodiment Ag is used alone. When the element A contains gold or Au at too high a ratio, the crystal transition rate becomes too rapid to obtain any sufficient degree of modulation and C/N at low linear velocity.

Antimony or Sb is preferable as the element B, and accounts for preferably at least 50 at %, more preferably at least 80 at % of the element B. In the most preferable embodiment Sb is used alone. When bismuth or Bi is contained in the element B at too high a ratio, there is an increase in the coefficient of absorption of the recording layer, which then makes the interference effect of light slender. This in turn makes the difference in reflectivity between the crystalline and amorphous phases small, so failing to obtain high C/N.

Tellurium or Te is preferable as the element C, and accounts for preferably at least 50 at %, more preferably at least 80 at % of the element C. In the most preferable embodiment Te is used alone. When selenium or Se is contained in the element C at too high a ratio, the crystal transition rate becomes too slow to obtain any enough erasing rate.

When z representing the content of the element M is below the lower limit of the range defined above, the crystal transition rate becomes too rapid to achieve any good C/N when recording 11T signals of long signal length at low linear velocity, and to obtain good repetitive recording properties. When z exceeds the upper limit of the range defined above, there is a decrease in the change in reflectivity incidental to phase changes, which then makes it impossible to obtain any sufficient degree of modulation. Of the elements M, titanium or Ti and vanadium or V, especially, Ti are particularly effective for decreasing the crystal transition rate. V and Ti are well effective for improving reliability under harsh conditions, e.g., at high temperature and humidity. In particular, V is so extremely effective for improving reliability. At least one of Ti and V, especially, V accounts for at least 80 at %, especially, 100 at % of the element M.

In the unrecorded region of the recording layer, it is desired that an ABC$_2$ phase such as AgSbTe$_2$, an In-C phase such as In-Te and a B phase such as Sb be present in the form of crystal phases. Here it is believed that the In-C phase is made up of InC.

In addition to the elements mentioned above, the recording layer may additionally contain other elements such as copper (Cu), nickel (Ni), zinc (Zn), iron (Fe), oxygen (O), nitrogen (N) and carbon (C) in the form of trace impurities.

In this regard, however, it is desired that the total content of these elements be up to 1 at %.

If the recording layer is made up of a mixture of recording and dielectric materials, then the degree of modulation is significantly improved due to some considerable reflectivity decrease in the amorphous or microcrystalline state. The reason is that the recording layer, if made up of a mixture of recording and dielectric materials, can then prevent a decrease in the quantity of light absorption even at a large thickness. The recording material has a refractive index n of about 4 to about 6 (4 in the amorphous state and 6 in the crystalline state) and an absorption coefficient k of about 2.2 to about 3.3 (2.2 in the amorphous state and 3.3 in the crystalline state), while the refractive index of the dielectric material is relatively high and n=ca. 2.3 to ca. 2.7. It is believed that the dielectric material is dispersed throughout the recording material. In that recording layer, the refractive index n decreases depending on the mixing ratio while the absorption coefficient k drops drastically; that is, the recording layer gives rise to a drastic decrease in the extinction modulus per unit thickness. This in turn enables the thickness of the recording layer to be increased so that the phase difference effect of the reflected light is enhanced, resulting in an increase in the reflectivity difference between the crystalline and microcrystalline or amorphous states and, hence, the degree of modulation being sufficiently increased.

In the recording layer construction which contains the recording material plus the dielectric material, no particular limitation is imposed on what type of dielectric material is contained in the recording layer. For instance, mention is made of various transparent ceramic materials such as silicon oxides such as $SiO_2$, silicon nitrides such as $Si_3N_4$, and zinc sulfides such as ZnS, which may be used alone or in admixture. Various glasses may be used as well. For instance, the so-called LaSiON containing La, Si, O and N, the so-called SiAlON containing Si, Al, O and N, or SiAlON containing Y may also preferably used. Among these, it is preferable to use dielectric materials having a refractive index of at least 1.4, particularly at least 2 in a wavelength range of 400 nm to 850 nm. It is here understood that the above wavelength range includes 780 nm at which current CD players are used, and are preferable for the optical recording media according to the present invention. More illustratively, it is preferable to use mixtures of ZnS and $SiO_2$, ZnS and $Si_3N_4$, and ZnS and $Ta_2O_5$ as the dielectric material. In the recording layer, the ratio of the "recording material" to the "recording material+dielectric material" is preferably at least 50 vol %, more preferably 60 to 80 vol %. The recording layer, when containing the recording material at too high a ratio, cannot be made thick by reason of an increase in the absorption coefficient thereof. As a result, neither any sufficient interference effect nor any high degree of modulation can be achieved. When the recording layer contains the recording material at too low a ratio, there is a drop of the degree of modulation, because the absorption coefficient of the recording layer becomes too small to make the reflectivity difference due to phase changes large.

Here it is noted that the absorption coefficient k of the recording material is about 3.3 in the crystalline state and about 2.2 in the microcrystalline or amorphous state, while the absorption coefficient k of the mixed recording layer comprising the recording and dielectric materials at 3:1 is about 1.2 in the crystalline state and about 0.6 in the microcrystalline or amorphous state.

The recording layer is not particularly limited in terms of thickness. To achieve high reflectivity and high degrees of modulation, however, it is desired that the recording layer be usually 100 Å to 2,000 Å, preferably 100 Å to 1,500 Å, more preferably 100 Å to 500 Å in thickness. It is here noted that when the recording layer contains the dielectric material, its thickness preferably ranges from 100 Å to 1,000 Å. When the recording layer is too thick, the cooling rate drops, making the effectiveness of the present invention insufficient. When the recording layer is too thin, on the other hand, not only is it difficult to make the recording layer uniform but it is also impossible to obtain valid reproduced signals due to many defects.

No particular limitation is placed on how to form the recording layer; in other words, it may be formed by any suitable means selected from sputtering, evaporation, etc. In the case of the recording layer containing the recording and dielectric materials, however, it is preferable to rely upon a multiple source sputtering technique making use of a plurality of targets, usually a target of the recording material and a target of the dielectric material. With these targets arranged in opposition to a substrate, sputtering is carried out while the substrate is rotated relative to each target. It is then preferable that the rotational speed of the substrate relative to the targets ranges from 1 rpm to 10 rpm. At too low a rotational speed the dispersion of both the materials in the recording layer becomes non-uniform, whereas at too high a rotational speed the degree of dispersion becomes too high for crystal growth upon crystallization. A composite target containing the recording and dielectric materials may be used as well. The recording layer formed by sputtering is considered to have a structure wherein particles of the dielectric material are dispersed in the recording material.

Figure 1:
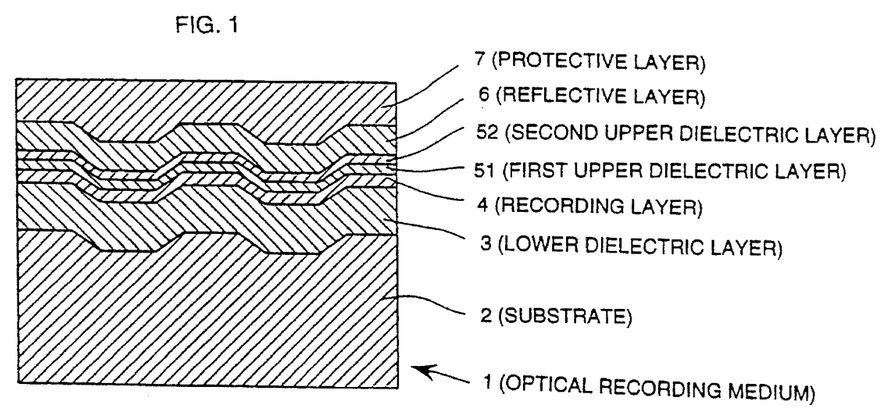
FIG. 1 is a fragmental cross-sectional schematic of one embodiment of the optical recording medium according to the present invention.

One schematic construction of the optical recording medium according to the present invention is illustrated in FIG. 1. As illustrated, the optical recording medium shown generally at 1 includes on a substrate 2 a lower dielectric layer 3, a recording layer 4, a first upper dielectric layer 51, a second upper dielectric layer 52, a reflective layer 6 and a protective layer 7.

Since the optical recording medium of this construction is used while the recording layer 4 is irradiated with a light beam through the substrate 2, the substrate 2 is preferably made up of a material substantially transparent to the light beam used, for instance, resins or glasses. Of these materials, preference is given to resins due to ease with which they are handled and low cost as well. For instance, use may be made of acrylic resins, polycarbonate resins, epoxy resins, polyolefin resins or like other resins. The substrate, although not critical in terms of shape and size, is usually in a disk form of about 0.5 mm to about 3 mm in thickness and about 50 mm to about 360 mm in diameter. The surface of the substrate may be provided, on demand, with a predetermined pattern of grooves or the like for tracking and addressing purposes.

The lower dielectric layer 3 prevents oxidation of the recording layer and cuts off the transmission of heat from the recording layer to the substrate during recording, thereby providing protection to the substrate. No particular limitation is imposed on what type of dielectric material is used for the lower dielectric layer 3. For instance, a choice may be made among those already referred to as the dielectric materials which can be contained in the recording layer. However, the dielectric material used has preferably a relatively high refractive index. The thickness of the lower dielectric layer 3 is preferably 500 Å to 3,000 Å, more preferably 1,000 Å to 2,500 Å at which any possible damage to the substrate upon recording is avoidable. It is here noted that the practical thickness of the lower dielectric layer may be determined by optical calculation from such a range in such a way that the reflectivity difference between the crystalline state and the amorphous or microcrystalline state reaches a maximum.

The first and second upper dielectric layers 51 and 52 are provided on the recording layer to protect the recording layer and to release through thermal conduction the heat that remains in the recording layer upon recording.

The first upper dielectric layer 51 contains at least one compound selected from the group consisting of aluminum nitride, silicon nitride and aluminum oxide or, in the alternative, is preferably made up substantially of at least one compound selected from that group. More preferably, it is substantially made up of at least one of aluminum nitride and silicon nitride, or aluminum oxide alone. Much more preferably, it is substantially made up of aluminum nitride and/or silicon nitride. In the most preferable embodiment, it is substantially made up of aluminum nitride alone. In the first upper dielectric layer the ratio of the metal(s) to the total of the metal(s), nitrogen and oxygen is preferably 30 at to 70 at %, more preferably 30 at % to 60 at %. At too low a metal content the strength of the first upper dielectric layer becomes insufficient, resulting in remarkable deterioration of the degree of modulation and C/N upon repetitive recording. At too high a metal content, on the other hand, the reflectivity change of the recording layer due to phase changes is reduced or limited due to an increase in the absorption coefficient of the first upper dielectric layer and, hence, a decrease in the interference effect; no high degree of modulation is obtainable.

In the present disclosure, the wording "the dielectric layer is substantially made up of a specific compound(s)" is understood to mean that the dielectric layer contains at least 80 at % of the specific compound(s).

The first upper dielectric layer is preferably 50 Å to 500 Å, more preferably 100 Å to 300 Å in thickness. When the first upper dielectric layer is too thin, the first upper dielectric layer makes the effectiveness of the present invention insufficient, whereas when the first dielectric layer is too thick, the cooling rate of the recording layer becomes slow, so rendering it difficult to make the recording layer amorphous or microcrystalline; that is, no high degree of modulation is obtainable.

On the other hand, the second upper dielectric layer 52 is made up of a material that is lower in thermal conductivity than the first upper dielectric layer. The second upper dielectric layer preferably contains at least one compound selected from the group consisting of silicon oxide, zinc sulfide, titanium oxide, zirconium oxide, zinc selenide, zinc telluride, tantalum oxide, zinc oxide, tin oxide or the like or, in the alternative, is preferably made up substantially of zinc sulfide and silicon oxide in particular. When zinc sulfide and silicon oxide are calculated as ZnS and $SiO_2$, respectively, it is desired that $SiO_2/(ZnS+SiO_2)$ be preferably 10 mol % to 50 mol %, more preferably 15 mol % to 30 mol %. Too little $SiO_2$ makes the second upper dielectric layer likely to crack upon repetitive recording, resulting in the incurrence of a C/N decrease. Too much $SiO_2$, on the other hand, causes the second upper dielectric layer to be so reduced in strength that the repetitive recording properties can become worse. The second upper dielectric layer is preferably 50 Å to 500 Å, more preferably 100 Å to 300 Å in thickness. When the second upper dielectric layer is too thin, the second upper dielectric layer fails to prevent deterioration of the first upper dielectric layer; no good repetitive recording properties are obtainable. When the second upper dielectric layer is too thick, on the other hand, the recording layer is cooled at so slow a cooling rate that difficulty can be involved in making the recording layer amorphous or microcrystalline; no high degree of modulation is again achievable.

The thermal conductivity of the first upper dielectric layer is preferably at least 10 W/m.K, more preferably at least 15 W/m.K, while that of the second upper dielectric layer is preferably less than 10 W/m.K, more preferably equal to or lower than 5 W/m.K. It is here noted that there values for thermal conductivity are obtained in a bulky state.

Preferably, each dielectric layer is formed by vapor phase growth techniques such as sputtering or evaporation. Especially when the first upper dielectric layer contains a nitride, it is preferable to form the dielectric layer by reactive sputtering in a nitrogenous atmosphere.

No particular limitation is imposed on what type of material is used for the reflective layer 6. For instance, high reflectivity metals such as Al, Au, Ag, Pt and Cu may be used alone or in alloy forms comprising two or more such metals. The thickness of the reflective layer is preferably 300 Å to 1,500 Å. At a thickness less than the lower limit of the range mentioned above, it is difficult to obtain sufficient reflectivity. Too large a thickness is unfavorable in terms of cost, because of making no appreciable contribution to improving reflectivity. The reflective layer is preferably formed by vapor phase growth techniques such as sputtering or evaporation.

The protective layer 7 is provided on the reflective layer for the purpose of improving scratch resistance and corrosion resistance. Preferably, this protective layer is made up of various organic substances. In particular, it is more preferably made up of substances obtained by exposure of radiation curable compounds or compositions to radiation such as electron and UV radiation. The protective layer has usually a thickness of about 0.1 μm to about 100 μm, and may be formed by ordinary techniques such as spin coating, gravure coating, spray coating, and dipping.

Figure 2:
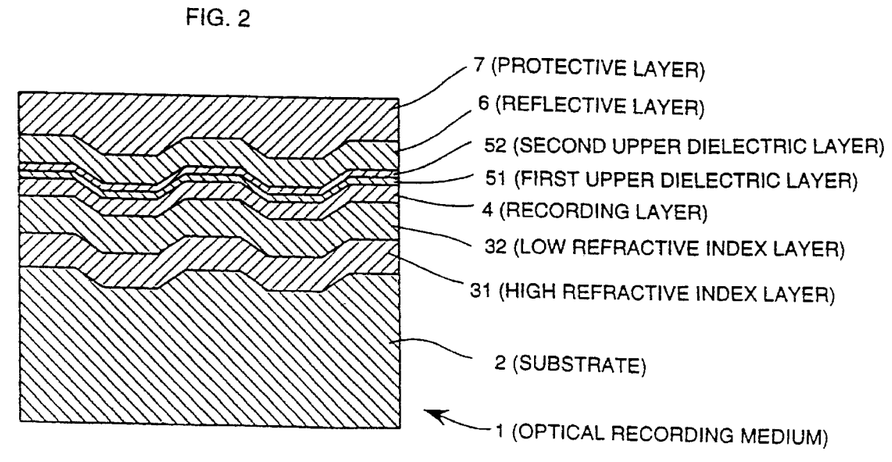
FIG. 2 is a fragmental cross-sectional schematic of another embodiment of the optical recording medium according to the present invention.

To enable the optical recording medium of the present invention to be used for reproduction with high reflectivity in accordance with the CD standard, it is preferable that the lower dielectric layer consists of at least one laminate comprising two dielectric laminae having different refractive indices, with the dielectric lamina having a higher refractive index located adjacent to the substrate. A preferable embodiment of this construction is illustrated in FIG. 2. As illustrated, the optical recording medium shown generally at 1 includes on a substrate 2 a high refractive index layer 31, a low refractive index layer 32, a recording layer 4, a first upper dielectric layer 51, a second upper dielectric layer 52, a reflective layer 6 and a protective layer 7. In this embodiment, the high refractive index layer 31 and the low refractive index layer 32 define together the above laminate.

A dielectric material forming the high refractive index layer 31 is one having a relatively high refractive index as is the case with the dielectric material which is preferably contained in the above recording layer, typically a refractive index of at least 2 at a wavelength of 400 nm to 850 nm.

A dielectric material forming the low refractive index layer 32 is one having a relatively low index, typically a refractive index of less than 2 at a wavelength of 400 nm to 850 nm. For such a dielectric material it is preferable to use $SiO_2$, $MgF_2$, $CaF_2$, and $LiF_2$ alone or in admixture. It is here noted that while reflectivity is much more improved by lamination of two or more such laminates, it is preferable that one or two such laminates are used, because too many laminates incur a remarkable drop of the degree of modulation.

Preferably, the high refractive index layer 31 is 500 Å to 1,500 Å in thickness while the low refractive index layer 32 is 300 Å to 1,500 Å in thickness. Where two such laminates are used, the laminate on the substrate side includes a high refractive index layer of preferably 750 Å to 900 Å, more preferably 800 Å to 850 Å in thickness and a low refractive index layer of preferably 400 Å to 500 Å, while the laminate on the recording layer side includes a high refractive index layer of preferably 750 Å to 900 Å, more preferably 800 Å to 850 Å in thickness and a low refractive index layer of preferably 1,000 Å to 1,400 Å, more preferably 1,200 Å to 1,300 Å in thickness.

The substrate 2, recording layer 4, first upper dielectric layer 51, second upper dielectric layer 52, reflective layer 6 and protective layer 7 are the same as explained with reference to FIG. 1. However, it is preferable that the recording layer 4, when made up of the recording material alone, is 100 Å to 500 Å in thickness, and when additionally containing the dielectric material, is 100 Å to 1,000 Å in thickness.

Described below is how to operate the optical recording medium of the present invention for recording and reproduction.

In the optical recording medium of the present invention, the recording layer has been crystallized all over the surface in the initialized state. Upon irradiation of the as-crystallized recording layer with a recording light beam (typically a laser light beam), the irradiated spot melts. Upon transmission of the recording light beam, the spot decreases in temperature so rapidly that it is made substantially amorphous or microcrystalline to form a signal recorded area. With the optical recording medium of the present invention, reliable recording and high C/N are achievable even when the speed of the recording light beam relative to the recording layer is low and hence the cooling rate of the irradiated spot is relatively low, because the crystal transition rate of the recording layer (at which the amorphous or microcrystalline phase grows into a coarse crystal) is slow. A C/N decrease due to repetitive recording, too, is prevented or avoided.

When it is desired to overwrite the recorded information, on the other hand, the recording area on which another signal is to be overwritten is irradiated with the recording light beam, while the rest of the recording layer is continuously irradiated with an erasing light beam. While the area irradiated with the erasing light beam increases in temperature, the temperature reached is relatively low and hence unlikely to exceed the melting point of the recording layer, because the erasing light beam is lower in power than the recording light beam. However, the area irradiated with the erasing light beam is so wide that a gentle temperature gradient can be established by heat accumulation. This makes the cooling rate of the area slower than the crystal transition rate mentioned above, so that the crystalline material can be formed. Although the recording area is once melted upon irradiation with the recording light beam, it can remain amorphous or microcrystalline, because the heat is rapidly diffused toward the reflective layer. Consequently, all of the area irradiated with the recording light beam becomes amorphous or microcrystalline upon overwriting, irrespective of whether the recording material is crystalline, amorphous or microcrystalline before the irradiation, and all of the area irradiated with the erasing light beam becomes crystalline, so that overwrite recording can be made. In this connection, it is noted that such overwrite recording may also be made by use of a single light beam, if it is modulated into recording and erasing light components.

Preferably, the recording layer is irradiated with a pulse form of recording light beam. By recording one signal by at least two cycles of irradiation, the accumulation of heat at the recording area is inhibited to prevent a swelling (teardrop phenomenon) of the trailing end of the recording area, so that C/N can be improved. Use of the pulse form of recording light beam also contributes to an improvement in the erasing rate.

It is understood that even when the recording layer contains the dielectric material, the changes in the recording material due to irradiation with the light beam are the same as mentioned above.

Practical values for the power $P_W$ of the recording light beam and the power $P_E$ of the erasing light beam may be experimentally determined, but preferable $P_W$ and $P_E$ lie in the following ranges. In the arrangement of FIG. 1, when the recording layer contains the recording material alone or along with the dielectric material, $P_W$ is at least 12 mW while $P_E$ is 4 mW to 9 mW. In the arrangement of FIG. 2, when the recording material is made up of the recording material alone, $P_W$ is at least 30 mW while $P_E$ is 18 mW to 25 mW. In the arrangement of FIG. 2, when the recording layer contains the dielectric material, $P_W$ is at least 30 mW while $P_E$ is at least 20 mW.

The reproducing light beam should be of low power that has no influence on the crystallographic state of the recording layer.

It is noted that the signal recorded area comprising an amorphous or microcrystalline material is lower in reflectivity than the unrecorded area comprising a crystalline material.

In using the optical recording medium of the present invention for recording and reproduction, the speed of the recording layer relative to each light beam mentioned above is not particularly limited. According to the present invention, practically great benefits are achievable over a wide range of 1.0 m/s to 10.0 m/s. Even at a relatively low speed of 1.2 m/s to 2.8 m/s in particular, a sufficient degree of modulation is achievable with satisfactory erasing rates. To add to this, the deterioration of the degree of modulation is little, if any, even upon repetitive recording.

EXAMPLE

In the ensuing description, the present invention will now be explained at greater length with reference to specific examples.

Several samples of the optical recording disk shown in FIG. 1 were prepared as follows.

SAMPLE NO. 1

On the surface of a disk form of polycarbonate substrate 2 of 133 mm in diameter and 1.2 mm in thickness on which grooves were simultaneously formed by injection molding, there were formed a lower dielectric layer 3, a recording layer 4, a first upper dielectric layer 51, a second dielectric layer 52, a reflective layer 6 and a protective layer 7, thereby preparing an optical recording disk sample of the construction shown in FIG. 1.

The lower dielectric layer 3 was formed by the sputtering technique using ZnS and $SiO_2$ for targets. $SiO_2/(ZnS+SiO_2)$ was 15 mol %. The refractive index of the lower dielectric layer was 2.33 at 780 nm wavelength. The lower dielectric layer 3 had a thickness of 1,700 Å.

The recording layer 4 was formed by RF sputtering at a power of 2.2 W/cm². The sputtering target used was an antimony or Sb target having Ag, In, Te and V chips attached to the surface. Shown in Table 1 is the composition (in atomic ratio) of the recording layer 4 as measured by ICP.

The recording layer 4 has the following compositional formula:

$$\{(Ag_aSb_bTe_{1-a-b})_x(In_{0.5}Te_{0.5})_ySb_{1-x-y}\}_{1-z}V_z$$

wherein a, b, x, y and z are the numeral values specified in Table 1. The thickness of the recording layer 4 was 170 Å.

The first upper dielectric layer 51 was formed by reactive sputtering using an Al target in an argon (Ar) atmosphere containing $N_2$ gas. The thickness of the first upper dielectric layer 51 is referred to in Table 1. Fluorescent x-ray analysis indicated that Al/(Al+N) of aluminum nitride in the first upper dielectric layer 51 was 48 at %. A bulky form of aluminum nitride at this composition was found to have a thermal conductivity of 30 W/m.K.

The second upper dielectric layer 52 was formed as in the case of the lower dielectric layer 3. The thickness of the second upper dielectric layer 52 is referred to in Table 1. A bulky form of $ZnS-SiO_2$ at this composition was found to have a thermal conductivity of 2.4 W/m.K.

Using a gold or Au target, the reflective layer was formed by sputtering at a thickness of 1,000 Å. The protective layer was formed by spin-coating an ultraviolet curing type of resin on the reflective layer, followed by curing by exposure to ultraviolet radiation. The protective layer had an as-cured thickness of 5 μm.

The sample was irradiated with 7.0 mW laser light to initialize (or crystallize) the recording layer.

While the thus initialized disk sample was rotated at a linear velocity (of 2.8 m/s) twice as high as that for a CD, signals (11T signals) of 393 kHz were recorded to measure the C/N of the reproduced signals. Also, the degree of modulation that is defined by (the reflectivity of the unrecorded area—the reflectivity of the recorded area)/the reflectivity of the unrecorded area was calculated by measuring the reflectivity of the recorded area. The results are reported in Table 1.

While the initialized disk sample was rotated at a linear speed of 2.8 m/s, signals having a frequency of 1,440 kHz were overwritten on the recording layer to find the erasing rate (post-recording C/N—C/N after irradiation with the erasing light beam). The results are reported in Table 1.

While the initialized disk sample was rotated at a linear velocity of 2.8 m/s, signals of 393 kHz were continuously recorded on the recording layer to find the number of recording cycles until C/N dropped to 45 dB and the degree of modulation after 5,000 recording cycles. The results are reported in Table 1. The term "unmeasurable" in the column "the degree of modulation after 5,000 recording cycles" in Table 1 indicates that samples could not be used for measurement due to serious damage to the substrates and dielectric layers upon recording, due to no tracking space, or due to unclear reproduced signals.

It is noted that since the maximum value for C/N was found where the power $P_W$ of the recording light beam was on the order of 12 mW, $P_W$ of 14.0 mW was used for the measurements mentioned above. The power $P_E$ of the erasing light beam was 6.5 mW while the power of the reproducing light beam was 1.0 mW. The wavelength of these light beams was 780 nm.

SAMPLE NOS. 2-1 & 2-2

These samples were prepared following Sample No. 1 with the exception that neither first upper dielectric layer nor second upper dielectric layer was formed, and were measured for similar characteristics. The results are reported in Table 1.

SAMPLE NOS. 3-1 THROUGH 3-6

These samples were prepared following Sample No. 1 with the exception that the thicknesses of the first and second upper dielectric layers were changed to those referred to in Table 1, and were measured for similar characteristics. The results are reported in Table 1.

SAMPLE NOS. 4-1 THROUGH 4-8

These samples were prepared following Sample No. 1 with the exception that the composition of the recording layer was changed to those referred to in Table 1, and were measured for similar characteristics. The results are reported in Table 1.

TABLE 1

| Sample No. | Recording Layer $\{(Ag_aSb_bTe_{1-a-b})_x(In_{0.5}Te_{0.5})_ySb_{1-x-y}\}_{1-z}V_z$ | | | | | First Upper Dielectric Layer | |
|---|---|---|---|---|---|---|---|
| | a | b | x | y | z | Composition | Thickness (Å) |
| 1 | 0.242 | 0.253 | 0.532 | 0.066 | 0.004 | Aluminum nitride | 200 |
| 2-1 (Comparison) | 0.242 | 0.253 | 0.532 | 0.066 | 0.004 | — | — |
| 2-2 (Comparison) | 0.242 | 0.253 | 0.532 | 0.066 | 0.004 | Aluminum nitride | 200 |
| 3-1 | 0.242 | 0.253 | 0.532 | 0.066 | 0.004 | Aluminum nitride | 100 |
| 3-2 | 0.242 | 0.253 | 0.532 | 0.066 | 0.004 | Aluminum nitride | 300 |
| 3-3 | 0.242 | 0.253 | 0.532 | 0.066 | 0.004 | Aluminum nitride | 600* |
| 3-4 | 0.242 | 0.253 | 0.532 | 0.066 | 0.004 | Aluminum nitride | 30* |
| 3-5 | 0.242 | 0.253 | 0.532 | 0.066 | 0.004 | Aluminum nitride | 200 |
| 3-6 | 0.242 | 0.253 | 0.532 | 0.066 | 0.004 | Aluminum nitride | 200 |
| 4-1 | 0.290 | 0.290 | 0.565 | 0.074 | 0.009 | Aluminum nitride | 200 |
| 4-2 | 0.204 | 0.265 | 0.401 | 0.110 | 0.006 | Aluminum nitride | 200 |
| 4-3 (Comparison) | 0.242 | 0.253 | 0.532 | 0.066 | 0** | Aluminum nitride | 200 |
| 4-4 (Comparison) | 0.874** | 0.042** | 0.119** | 0.640** | 0.006 | Aluminum nitride | 200 |
| 4-5 (Comparison) | 0.627** | 0.124 | 0.102** | 0.162 | 0.005 | Aluminum nitride | 200 |
| 4-6 (Comparison) | 0.053** | 0.316 | 0.069** | 0.480* | 0.009 | Aluminum nitride | 200 |
| 4-7 (Comparison) | 0.276 | 0.241 | 0.520 | 0.081 | 0.205* | Aluminum nitride | 200 |
| 4-8 (Comparison) | 0.219 | 0.260 | 0.860** | 0.074 | 0.006 | Aluminum nitride | 200 |

TABLE 1-continued

|  | Second upper Dielectric Layer | | Degree of Modulation | | Erasing Rate (dB) | C/N (dB) | |
|---|---|---|---|---|---|---|---|
| Sample No. | Composition | Thickness (Å) | Initial (%) | After 5,000 recording cycles | | Initial (dB) | Number of Repetition |
| 1 | ZnS—SiO$_2$ | 150 | 79 | 78 | 42 | 62 | >5000 |
| 2-1 (Comparison) | ZnS—SiO$_2$ | 150 | 67 | 66 | 33 | 63 | >5000 |
| 2-2 (Comparison) | — | — | 77 | unmeasurable | 40 | 62 | <1000 |
| 3-1 | ZnS—SiO$_2$ | 300 | 78 | 75 | 42 | 60 | >5000 |
| 3-2 | ZnS—SiO$_2$ | 100 | 80 | 76 | 38 | 63 | >5000 |
| 3-3 | ZnS—SiO$_2$ | 150 | 59 | 53 | 43 | 58 | <2000 |
| 3-4 | ZnS—SiO$_2$ | 150 | 65 | 63 | 35 | 63 | >5000 |
| 3-5 | ZnS—SiO$_2$ | 600* | 60 | 52 | 42 | 57 | <2000 |
| 3-6 | ZnS—SiO$_2$ | 30* | 76 | unmeasurable | 41 | 62 | <1000 |
| 4-1 | ZnS—SiO$_2$ | 150 | 77 | 77 | 39 | 63 | >5000 |
| 4-2 | ZnS—SiO$_2$ | 150 | 78 | 76 | 43 | 63 | >5000 |
| 4-3 (Comparison) | ZnS—SiO$_2$ | 150 | 65 | unmeasurable | 40 | 57 | <1000 |
| 4-4 (Comparison) | ZnS—SiO$_2$ | 150 | 49 | unmeasurable | 30 | 52 | <1000 |
| 4-5 (Comparison) | ZnS—SiO$_2$ | 150 | 35 | unmeasurable | 20 | 53 | <1000 |
| 4-6 (Comparison) | ZnS—SiO$_2$ | 150 | 65 | unmeasurable | 37 | 58 | <1000 |
| 4-7 (Comparison) | ZnS—SiO$_2$ | 150 | 40 | unmeasurable | 24 | 54 | <1000 |
| 4-8 (Comparison) | ZnS—SiO$_2$ | 150 | 42 | unmeasurable | 26 | 53 | <1000 |

**Departures from the inventive range
*DePartures from the preferred range

Sample No. 1 had a reflectivity of 4.5% as measured just after preparation and when the recording layer remained amorphous and a reflectivity of 27% as measured after initialization. In other words, the possible maximum degree of modulation is 83%. Even upon recording, therefore, the practically obtained degree of modulation is 79%, a figure approximating to the theoretical maximum value. The degree of modulation undergoes only a reduced or limited deterioration upon repetitive recording, and the erasing rate is satisfactory as well. To add to this, C/N is satisfactory and incurs only a limited or reduced deterioration upon repetitive recording.

However, Sample No. 2-1 of the construction where the first upper dielectric layer 51 was removed from Sample No. 1 showed a reflectivity of 3% just after preparation and a reflectivity of 31% after initialization. In other words, the possible maximum degree of modulation is 90%, but the practically obtained degree of modulation is 67% at most. The erasing rate is low as well. In this regard, Sample No. 2-1 was modified such that the thickness of the second upper dielectric layer was reduced to 100 Å to increase the cooling rate of the recording layer. It was then found that the degree of modulation is increased to 80%, but the erasing rate drops to 10 dB or lower. With the disk of this construction, overwrite recording cannot possibly be feasible. The reason is that when overwrite recording is made by use of a single intensity-modulated light beam, the erasing rate must practically exceed 30 dB.

Sample No. 2-2 of the construction where the second upper dielectric layer 52 was removed from Sample No. 1 is slightly inferior to Sample No. 1 in terms of the degree of modulation and C/N. However, the degree of modulation and C/N upon repetitive recording become significantly worse.

Sample Nos. 3-3 and 3-5 in which the first upper dielectric layer 51 or the second upper dielectric layer 52 is thicker are reduced in terms of both the degree of modulation and C/N because of a slow cooling rate of the recording layer, resulting in a lowering of the repetitive recording properties. Sample No. 3-4 in which the first upper dielectric layer 51 is thinner is reduced in the degree of modulation. Sample No. 3-6 in which the second upper dielectric layer 52 is thinner fails to inhibit deterioration of the first upper dielectric layer 51 upon recording, and so shows similar results as obtained in the case of Sample No. 2-2.

Sample No. 4-3 with the recording layer containing no vanadium is lower in the degree of modulation and C/N than Sample No. 1, and is much inferior to Sample No. 1 in terms of the degree of modulation and C/N upon repetitive recording. This appears to be due to the fast crystal transition rate of the recording layer, which would render it difficult to make the recording layer amorphous upon recording.

Sample No. 4-4 with the recording layer containing vanadium but the ratio of other elements departing from the inventive scope is much lower than Sample No. 4-3 in terms of recording characteristics. This again appears to be due to the fast crystal transition rate of the recording layer. Sample Nos. 4-5 through 4-8 all have much inferior characteristics.

A sample prepared following Sample No. 1 with the exception that the thickness of the recording layer was changed to 1,000 Å was 30% and 15 dB lower in the degree of modulation and C/N than Sample No. 1, because the cooling rate of the recording layer was slow.

A sample prepared following Sample No. 1 with the exception that Al/(Al+N) of the aluminum nitride of the first upper dielectric layer 51 was changed to 28 at % was equivalent to Sample No. 1 in terms of the initial degree of modulation and C/N, but the number of repeatable recording cycles dropped to at most 1,000. This appears to be due to a strength reduction of the first upper dielectric layer 51. The degree of modulation of another sample with Al/(Al+N) changed to 73 at % decreased to 50% or lower.

In a sample prepared following Sample No. 1 with the exception that SiO$_2$/(ZnS+SiO$_2$) of the second upper dielectric layer 52 was changed to 5 mol %, the number of repeatable recording cycles dropped to 1,000 or less, and in another sample with SiO$_2$/(ZnS+SiO$_2$) changed to 60 mol %, the number of repeatable recording cycles again dropped to 1,000 or less.

Equivalent characteristics were obtained even when the material of the first upper dielectric layer was changed from aluminum to silicon nitride [Si/(Si+N)=45 at %]. The effectiveness of the present invention was again observed even when aluminum oxide was used in place of aluminum nitride.

Equivalent characteristics were obtained even when at least a part of Sb of the recording layer was changed to Bi. When the amount of Sb substituted by Bi was more than 50 at %, however, the absorption coefficient of the recording layer became too high to obtain any large reflectivity difference between the crystalline and amorphous states; the degree of modulation decreased. Equivalent characteristics were again obtained even when at least a part of V was changed to Ti. When at least a part of V was changed to one or more elements selected from the group consisting of Zr, Hf, Nb, Ta, Mn, W and Mo, too, the effectiveness of the present invention was observed. When at least a part of Ag was changed to Au, the crystallization rate was slightly faster than would be possible with the sole use of Ag. However, an increase in the amount of V added gave equivalent results to the sole use of Ag.

The effectiveness of the present invention will be understood from the results of the examples mentioned above.

Japanese Patent Application No. 6-82235 is incorporated herein by reference as well as the above-cited patent publications.

Although some preferable embodiments and examples have been described, many modifications and variations may be made thereto in the light of the above teachings. It is therefore to be understood that within the scope of the appended claims, the invention may be practiced otherwise than as specifically described.

We claim:

1. An optical recording medium comprising a substrate, a lower dielectric layer, a recording layer, a first upper dielectric layer contiguous to said recording layer, a second upper dielectric layer and a reflective layer in the order mentioned above, wherein information is recorded or erased by irradiating said recording layer with a light beam to change the crystallographic state thereof, said recording layer comprising a recording material containing an element A that represents silver and/or gold, an element B that represents antimony and/or bismuth, an element C that represents tellurium and/or selenium, an element indium, and an element M that represents at least one element selected from the group consisting of titanium, zirconium, hafnium, vanadium, niobium, tantalum, manganese, tungsten and molybdenum, with the atomic ratio of the elements in said recording material having the following formula:

$$\{(A_aB_bC_{1-a-b})_x(In_{0.5}C_{0.5})_yB_{1-x-y}\}_{1-z}M_z$$

wherein:

$0.10 \leq a \leq 0.40$ $0.10 \leq b \leq 0.40$ $0.20 \leq x \leq 0.80$ $0.01 \leq y \leq 0.60$ $0.001 \leq z \leq 0.20$ said first upper dielectric layer containing at least one compound selected from the group consisting of aluminum nitride, silicon nitride and aluminum oxide, and said second upper dielectric layer being made up of a material that has a thermal conductivity lower than that of said first upper dielectric layer and said second upper dielectric layer is 50 Å to 500 Å in thickness.

2. The optical recording medium as claimed in claim 1, wherein said first upper dielectric layer is substantially made up of at least one compound selected from the group consisting of aluminum nitride, silicon nitride and aluminum oxide, with the ratio of the metal(s) relative to the total of the metal(s), nitrogen and oxygen ranging from 30 at % to 70 at %.

3. The optical recording medium as claimed in claim 1, wherein said second upper dielectric layer contains zinc sulfide.

4. The optical recording medium as claimed in claim 1, wherein said second upper dielectric layer contains silicon oxide.

5. The optical recording medium as claimed in claim 1, wherein said second upper dielectric layer is substantially made up of zinc sulfide and silicon oxide, with the $SiO_2/(ZnS+SiO_2)$ ratio lying in the range of 10 mol % to 50 mol % when zinc sulfide and silicon oxide are calculated as ZnS and $SiO_2$, respectively.

6. The optical recording medium as claimed in claim 1, wherein said first upper dielectric layer is 50 Å to 500 Å in thickness.

7. The optical recording medium as claimed in claim 1, wherein said recording layer is 100 Å to 500 Å in thickness.

8. The optical recording medium as claimed in claim 1, wherein silver accounts for at least 50 at % of the element A, antimony accounts for at least 50 at % of the element B, and tellurium accounts for at least 50 at % of the element C.

9. The optical recording medium as claimed in claim 1, wherein the relative speed of the recording layer relative to a light beam is 1.0 m/s to 10.0 m/s.

* * * * *